Aug. 19, 1969  L. E. STANHOPE  3,461,605

GREENHOUSE

Filed Nov. 4, 1966  3 Sheets-Sheet 1

Aug. 19, 1969　　　　L. E. STANHOPE　　　　3,461,605
GREENHOUSE
Filed Nov. 4, 1966　　　　　　　　　　3 Sheets-Sheet 2
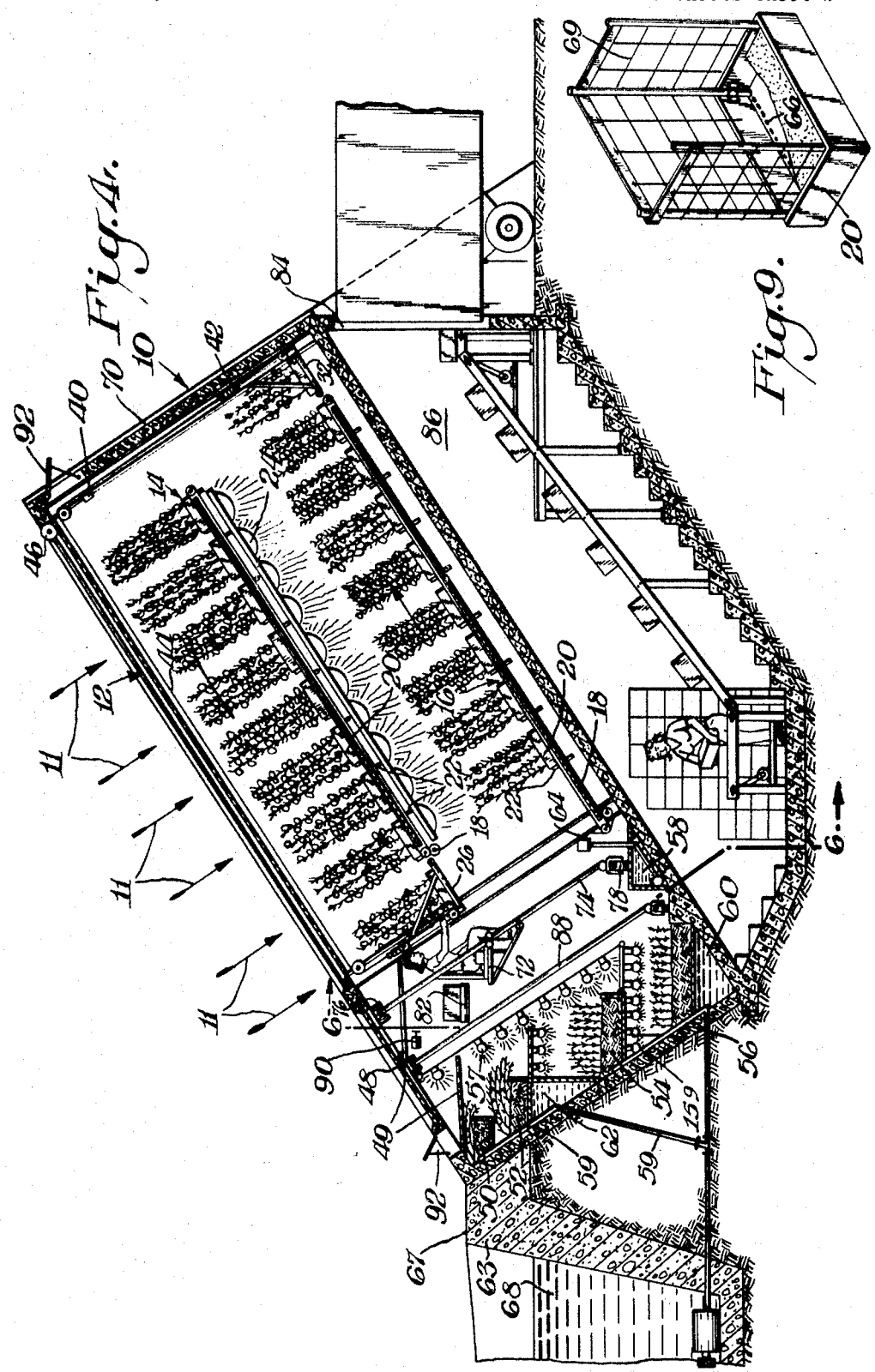

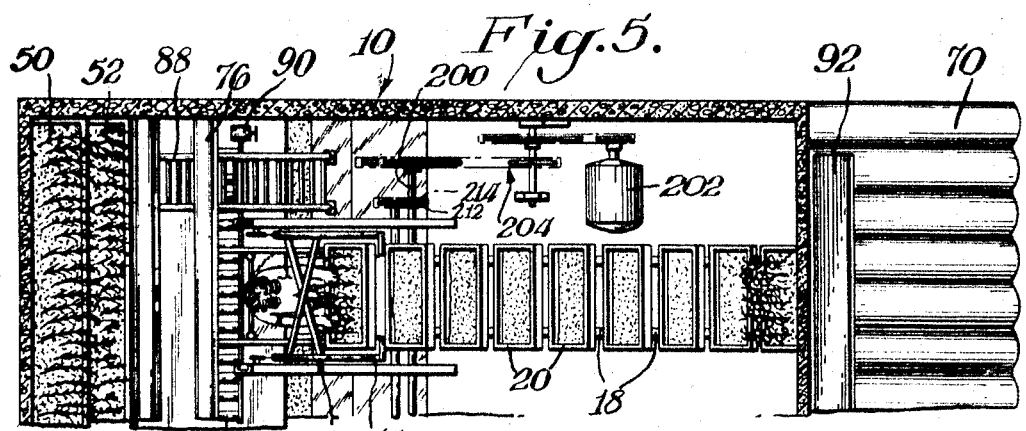
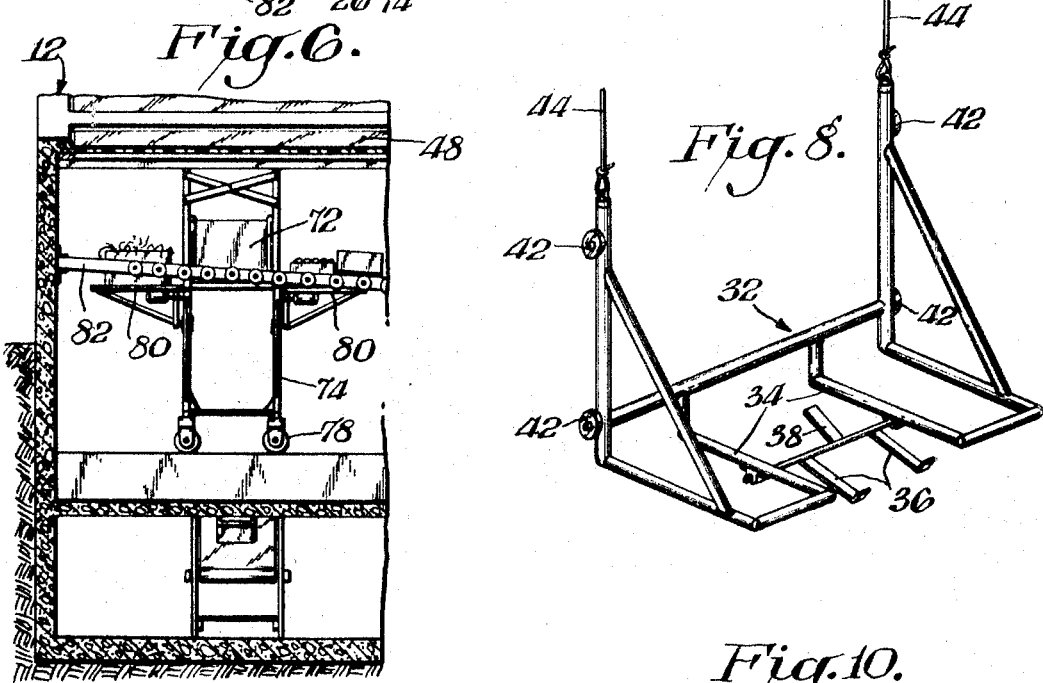
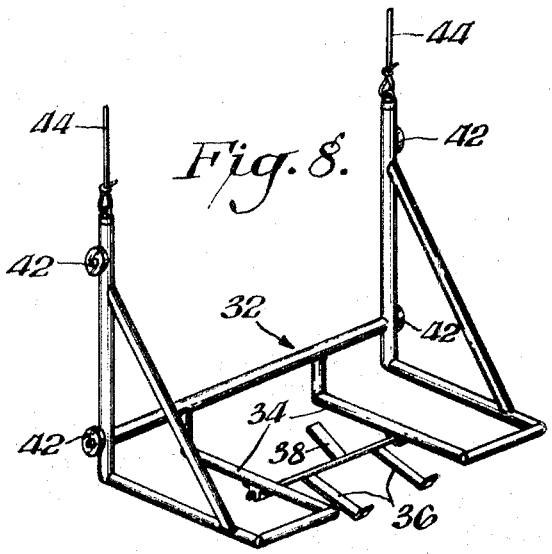
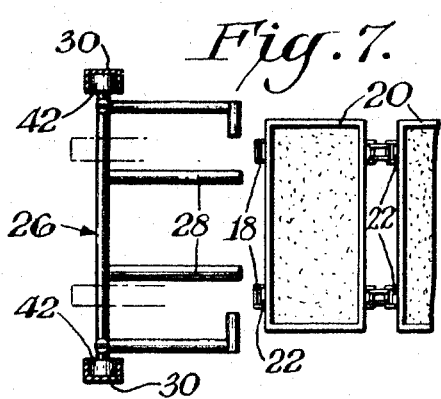
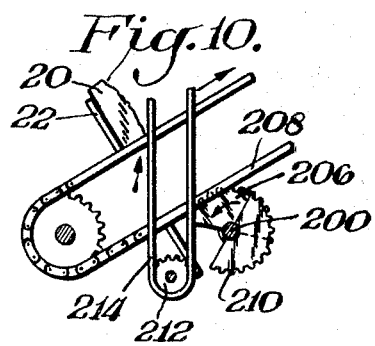

United States Patent Office 3,461,605
Patented Aug. 19, 1969

3,461,605
GREENHOUSE
Lawrence E. Stanhope, Rte. 1, Box 303, Road J,
Highway 64, Swanton, Ohio 43558
Filed Nov. 4, 1966, Ser. No. 592,141
Int. Cl. A01g 9/14, 9/24
U.S. Cl. 47—17                            11 Claims

ABSTRACT OF THE DISCLOSURE

A greenhouse has a top wall inclined for being only southernly disposed with a first inclined growing area under a transparent portion of the top wall and with a second inclined growing area under the first area.

This invention relates to a greenhouse or other structure for enclosing a growing area and particularly to such a greenhouse which effectively utilizes the suns rays for its growing area.

In my prior Patent No. 2,805,518, I disclosed a greenhouse which differed from conventional greenhouses.

An object of this invention is to provide a greenhouse of the above type which is capable of even greater growing area so as to appreciably increase the yield therein.

A further object is to provide such a greenhouse which is capable of including a shadable or a sun exposed growing area for mature plants, as well as a shadable or a sun exposed area for cuttings.

A still further object is to provide a greenhouse which may effectively enclose an increased growing area while minimizing the manual requirements thereof.

In accordance with this invention the greenhouse is in the form of an enclosure having an inclined southernly disposed top wall with a first inclined growing area arranged under the transparent portion of the top wall and a second inclined growing area disposed under the first growing area. Conveyerized beds may be on each growing area so that the beds may be conveniently transferred from one area to another to selectively expose each bed to the suns rays. The transfer of beds may be advantageously accomplished by a pair of elevators which are interconnected so that when one elevator is lowered to transfer a bed to the lower growing area the other elevator is raised to permit transfer of a different bed to the upper growing area.

In a preferred form of this invention a vertical carriage is provided which faces the lower edge of the sloping growing areas. Thus a worker may sit on the carriage and easily manipulate the plants without the necessity of bending over to reach the beds carrying the plants. This is possible because the worker under the influence of gravity is seated in a vertical position whereas the plants or work areas are inclined, thus eliminating the necessity of the worker bending forward or being inclined to reach the plants. The greenhouse may also include a shadable or a sun exposed horizontal growing area near the vertical carriage wherein cuttings may grow until they reach sufficient maturity to be ready for transfer to one of the primary sloping growing areas.

Novel features and advantages of the present invention will become more apparent to one skilled in the art by reference to the following description in conjunction with the accompanying drawings wherein similar references characters refer to similar parts therein which:

FIGURE 4 is a cross-sectional view taken through FIGURE 2 along the line 4—4;

FIGURE 5 is a plan view in section of a portion of the greenhouse shown in FIGURE 4;

FIGURE 6 is a cross-sectional view taken through FIGURE 4 along the line 6—6;

FIGURE 7 is a plan view of a portion of the greenhouse shown in FIGS. 1–6;

FIGURE 8 is a perspective view of one of the elevators used in the greenhouse shown in FIGS. 1–5;

FIGURE 9 is a perspective view partially broken away of one of the beds used in the greenhouse shown in FIGS. 1–5; and FIGURE 10 is an elevational view of the drive mechanism for the embodiment of the invention shown in FIGS. 1–5.

Figure 1:
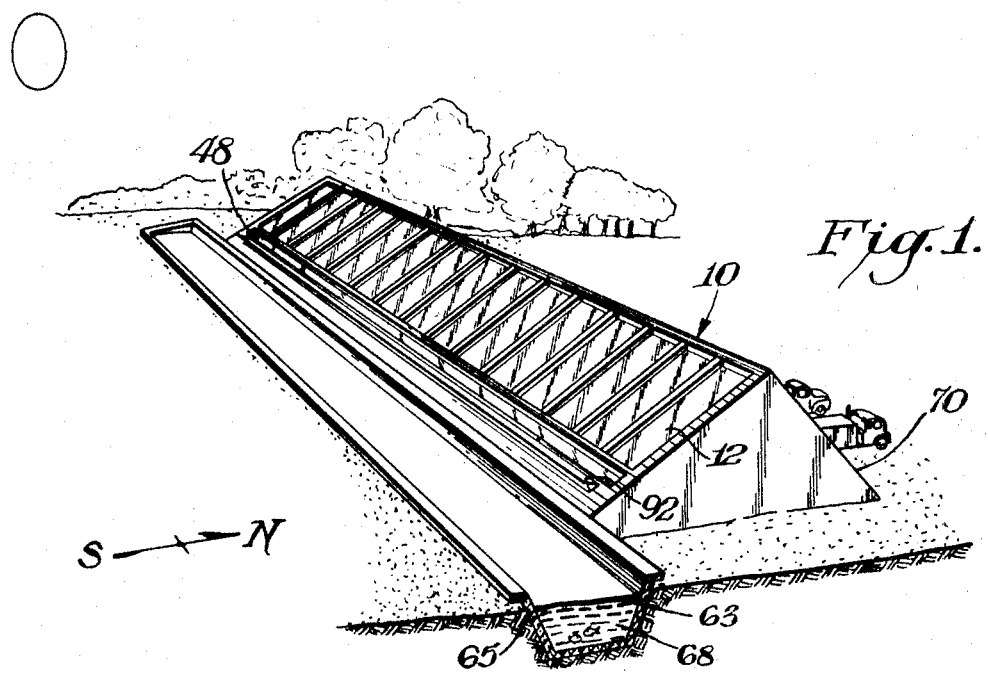
FIGURE 1 is a perspective view of one embodiment of this invention.

The following description relates to the use of the greenhouse as an enclosure for plants. It is to be understood, however, that the term greenhouse is used herein in its broadest sense so as to include any enclosure for a growing area which requires exposure to the sun rays to enhance the growth.

As shown in FIGURES 1–5, greenhouse 10 includes a sloping southernly disposed wall 12 the major portion of which is made of a transparent material such as Mylar The degree of slope will, of course, depend upon the geographical location of the greenhouse since it is desired that the rays of the sun should be at substantially right angles to the growing area. The optimum production is achieved, however, when the inclination is between 30° and 60°. For example, with a slope of 33° the growing area is increased by 20%. Depending upon the geographical location the inclination may, of course, vary.

Within greenhouse 10 are disposed at least two inclined growing areas which are parallel to inclined roof 12. It is to be understood that more than two areas may be provided. For the sake of clarity, only two are shown. These growing areas are best illustrated in FIGURE 4. As indicated therein, an upper growing area 14 is exposed to the suns rays while a lower growing area 16 is positioned below area 14. Each growing area includes a conveyor belt 18 which carries a plurality of closely spaced beds 20. Belt 18 includes projections 22 for maintaining the spacing between beds 20 and for preventing the beds from sliding downwardly off the conveyors. Beneath the upper growing area 14 is arranged a plurality of heating means such as lights 24 for providing heat, for example to heat the lower growing area 16. Lights 24 are also useful when there is insufficient sunlight.

An elevator 26 is arranged to move between the lower ends of areas 14 and 16 to permit transfer of beds 20 from upper area 14 to lower area 16. Elevator 26 is best shown in FIGURES 4 and 7 and includes a framework having a pair of arms 28 arranged to fit between conveyor belt 18. The framework 26 is guided in rails 30 so that elevator or framework 26 moves perpendicular to the inclination of growing areas 14 and 16. When it is desired to transfer a bed 20 from area 14 the following operation takes place.

Conveyors 18 are actuated so that the beds on the lower area 16 are moved upwardly thereby leaving the lower most space empty. Simultaneously the beds on the upper growing area 14 are moved downwardly. When the stop member 22 holding the lower most bed 20 is rotated to the under side of conveyor 18, the last bed slides directly onto elevator 26 by the action of gravity. Elevator 26 is then moved downwardly until it is slightly lower than lower conveyor belts 18. Since bed carrying arms 28 are between conveyor belts 18, the bed 20 is deposited on the lower conveyor belts 18. Elevator 26 can then remain in this lowered position until it is time to transfer another bed whereupon the prior process is repeated with the beds on the lower conveyor being moved upwardly to permit elevator 26 to be raised without interfering with any bed in the lower growing area.

A second elevator 32 (FIGURES 4 and 8) is provided at the upper ends of growing areas 14 and 16. This elevator differs from elevator 26 in that the upper elevator requires positive means for grasping a bed from lower area 16 so that it can be transferred to upper area 14. As best shown in FIGURE 8, elevator 32 includes a framework having a pair of inward arms 34 and a pair of flanged grasping members 36 which are pivoted to and from a position parallel to arms 34. The control of arms 36 may be attained by any convenient source of power such as a switch operated motor. Thus, for example when a spacer 22 pushes the last bed onto arms 34, the bed contacts switch 38 (FIGURE 8) so that grasping members 36 are moved upwardly after the bed is moved onto arms 34 to prevent the bed from sliding off frame 32. Frame or elevator 32 is then raised until it is adjacent to upper area 14 whereupon frame 32 contacts limit switch 40 (FIGURE 4) to reverse the direction of movement of grasping members 36, thus permitting the bed to slide onto upper conveyors 18.

Advantageously both elevator 32 and elevator 26 are provided with rollers 42 which in turn are guided in rails to maintain the elevators parallel to each other and perpendicular to the growing areas 14 and 16. Additionally elevators 26 and 32 are interconnected by, for example a common cable 44 so that the elevator operates together in such a manner that when elevator 26 is lowered, elevator 32 is raised. This not only assures the proper cooperation between the elevators of having the bed lowered when another bed is raised, but actually minimizes the wear on the drive for the elevators. In this respect it is pointed out that the lowering of one elevator cooperates in raising the other elevator thus requiring a lesser force for raising of the other elevator. Since it is essential that the conveyors 18 of both the upper area and lower area and that the elevators 26 and 32 operate together, both the elevators and the conveyors may be driven by a single power drive such as controlled through a motor in any conventional manner. Accordingly when a transfer of beds is desired both conveyors are simultaneously driven so that a space is left empty at the lowermost portion of lower area 16 and at the upper area 14 while at the same time a bed is transferred to elevator 26 and another bed is transferred to elevator 32.

FIG. 10 shows one possible drive arrangement for the conveyors and elevators. Shaft 200 is driven by motor 202 of FIG. 5 through a gear reduction drive 204 which reduces the speed any desired amount. For the sake of clarity FIG. 10 merely illustrates the drive for lower conveyor 18 and elevator 26. The upper conveyor and elevator 32 may be suitably connected to this drive. As indicated therein lost motion gear 206 on shaft 200 drives sprocket 208 of lower conveyor 18 while lost motion gear 210 also on shaft 200 meshes with gear 212 to rotate belt 214 driving conveyor 26.

An advantageous form of this invention includes various devices to maximize the safety of the worker. For example the elevator 26 may include a safety rail to act as a bumper and prevent any beds 20 from striking the worker, should the beds accidentally slide off conveyor 18. Another safety feature is the incorporation of a pair of safety cams welded together to provide a positive stopping means to assure that the beds 20 are stopped when the elevator moves and remains stopped throughout the elevator movement. This arrangement may include, for example, a manually controlled device to control the cams to disengage the elevators and conveyors from the drive shaft. The cams are welded together to assure joint operation.

Figure 2:
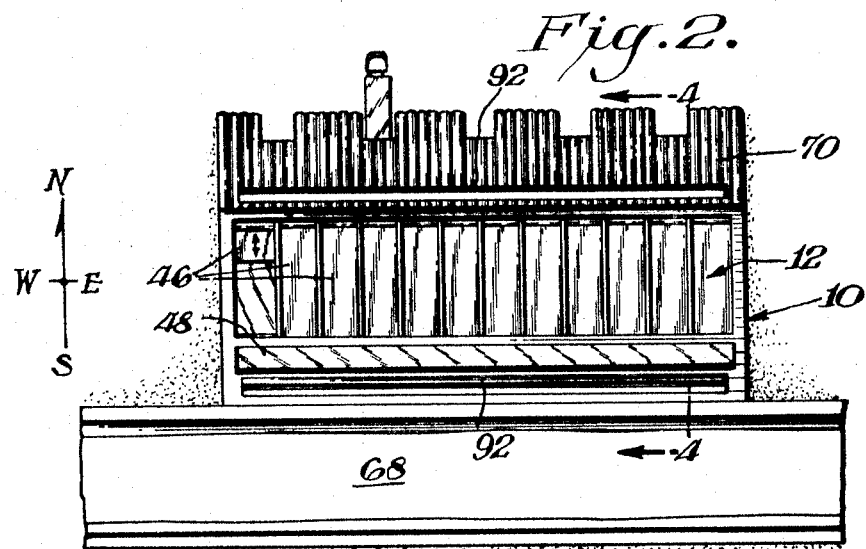
FIGURES 2 and 3 are a plan view and an end view, respectively, of the embodiment of the invention shown in FIGURE 1.

As illustrated in FIGURE 2, the transparent section of roof 12 may be covered by curtains 46, thus when the sun is not shining the transparent sections may be made opaque to minimize the loss of heat.

Roof 12 also includes a section 48 which may be shaded by curtains 49 as shown in FIGURE 4. There may be any desired number of curtains 49 for controlling the amount and location of sun light. Beneath this section a plurality of horizontal growing areas 50, 52, 54, and 56 are provided for cuttings or young plants which do not require sun light. Heating means such as lights 57 provide the necessary heat for the young plants. Both curtains 49 and lights 57 are movable to facilitate access to the growing areas. Curtains 49 are within greenhouse 10 and inclined to the roof so as to reflect the sun's rays 11 inside the house 10.

Growing areas 16, 50, 52, 54, and 56 are fed by a solution of, for example minerals and water from triangular reservoir 58 and main reservoir 68. Triangular reservoir 58 includes a spray nozzle 64 for spraying the lower most bed; since all of the beds in growing areas 14 and 16 are periodically rotated it is sufficient to locate only a single spray nozzle 64 to accommodate all of the beds in both inclined growing areas. Where there are a plurality of sets of growing areas, a spray nozzle 64 is provided for each set. The triangular shape of reservoirs 58, 60, 62, is particularly advantageous in that it facilitates for the periodic cleaning or draining of the reservoirs since the lower most portions of each reservoir is of minimum area.

As shown in FIG. 4 the pumping arrangement for the reservoirs include a pumping conduit 59 which feeds liquid into bed 50 until the bed is sufficiently filled. A valve in bed 50 is then opened to drain the liquid into lower bed 52. The slanted southern wall of greenhouse 10 is conveniently utilized to guide the flow of liquid into bed 52. As is thus readily apparent a pair of pump conduits 59, 159 is provided for each pair of beds 50, 52 and 54, 56, respectively.

The slope of growing areas 14 and 16 also permits the use of a simplified bed structure. This structure is shown in FIGURE 9 and includes a bed or container 20 which is substantially imperforate except for drain holes 66 located at the lower side of the bed. Since bed 20 is inclined when on conveyors 18, it is not necessary to provide drain holes throughout the entire bottom of the bed. Bed 20 also includes a three sided framework 69 for supporting the plants. For the sake of clarity framework 69 is shown only in FIG. 9. As indicated therein framework 69 is of open mesh form large enough for the worker to insert her hands through. Additionally the inclined structure is such that the solution can be recirculated. Another advantage of the sloping structure is that precipitation will flow from roof 12 to external reservoir 68 which can act as a main supply of liquid for the internal reservoirs. If desired reservoir 68 can be utilized to be its full aesthetic capacity by for example, providing the reservoir with water plant or animal life.

Figures 3, 3A:
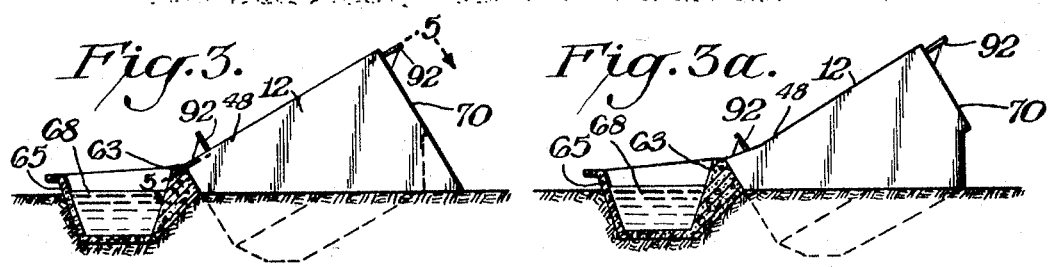
FIGURE 3a is an end view of a modified form of the greenhouse shown in FIGS. 1–3.

Reservoir 68 has a number of other advantages. For example, reservoir 68 adds support for the southern wall of greenhouse 10, as well as a convenient walkway 67 as shown in FIG. 4. As shown in FIGS. 3 and 4 a wall 65 of reservoirs 68 is lower than wall 63 to permit spillage of excesive liquid.

Greenhouse 10 may be shaped as shown in FIGURE 3a with the section 48 of roof 12 inclined at a different angle than the main section, since the angle or slope of the section 48 is not critical. Alternatively section 48 can be at the same inclination as the remainder of roof 12 as shown for example in FIGURE 3. It is further noted that roof 12 and wall 70 can advantageously be at right angles to each other. This is advantageous in that the right angular structure is the most stable structure possible, thus affording the best protection against hurricanes, tornadoes, or other natural disaster. Additional safety is afforded by by the lack of vertical walls, thereby minimizing danger from wind damage, etc., as well as extra strength from the trianguar shape. Although a right triangle is preferred, other triangles may be used without departing from the spirit of this invention.

A particular advantage of greenhouse 10 is that the walks can be eliminated, since as later described, the workers work from carriages without lifting and at a faster and more efficient pace with fewer accidents. All plants in beds 20 are brought to the workers on carriages, thus eliminating the walks between growing areas. As a result of eliminating walks, the growing area is more than doubled and since there are two levels of main growing areas the actual growing area could be about four times as great a growing area as in a conventional greenhouse of the same overall size. It is further noted that the actual growing area is 80 percent greater than the roof area.

FIGURE 4 illustrates an important feature of this invention relating to the position of a worker during minipulation of the plants. As indicated therein, the worker is provided with a carriage or seat 72 which moves up and down on support 74. Carriage 72 is arranged to seat the worker in the normal vertical position with respect to the ground in contrast to the inclined position of growing areas 14 and 16. Since the lower edge of the sloping growing areas face the vertical carriage, the worker may need not bend to reach the plants, rather the worker may sit in the most comfortable vertical position and efficiently work on the plants. The upper end of support 74 rides in rail 76 while the lower end rides over reservoir 58 on roller 78. It is thus possible to move the support between various growing areas throughout greenhouse 10.

Since support 74 is inclined, it would have a tendency to move or rotate clockwise and assume a vertical position, thus the inclination of support 74 causes its rollers 78 to be wedged against the greenhouse floor with stability to support 74.

As shown in FIGURE 6 carriage 72 is provided with a pair of horizontal platforms 80. It is additionally noted that carriage 72 is located between sloping main growing areas 14 and 16 and the horizontal growing areas. Additionally the carriage is located near discharge conveyor 82. This location of carriage 72 is particularly desirable. For example when greenhouse 10 is used for growing tomatoes, a worker may remove mature tomatoes from bed 20 and place the tomatoes in baskets on one of the platforms 80. When a basket if filled, the worker simply slides the basket to discharge conveyor 82 without the necessity of lifting or carrying the basket. If the worker should be positioned below conveyor 82, she may raise her carriage by simply pushing a button to operate the motor driven carriage. The worker may also conveniently take cuttings from the tomatoe vines in bed 20 which will be later transferred to the horizontal growing area for growing mature plants, thus the main growing areas are used for supplying both mature tomatoes and cuttings. The cuttings are then transferred to the secondary horizontal growing areas until they become mature plants whereupon they are retransferred back to the main growing areas to provide more tomatoes and more cuttings. Platforms 80 are also vertically movable either independently of or with carriage 72.

As shown in FIGURE 4 greenhouse 10 is supported by an artifical structure 84 to create a storage and work area beneath the greenhouse. Discharge conveyor 82 may for example end in this lower work and storage area 86 where other workers process and transfer the crops. In time of disaster this area 86 may also be used as a shelter. The utilization of an area such as 86 is also advantageous since it is easy to control its temperature. Access to area 86 may be had by periodic sets of steps disposed between the secondary growing areas. As shown in FIG. 2 greenhouse 10 includes spaced cutouts to permit trucks to back in toward area 86 for loading.

Access is had to the horizontal growing areas by a ladder 88. This ladder is similar to support 74 in that it rides in rails at its upper end with the wheels at the lower end being wedged against the horizontal floor. If desired a carriage may be movably mounted on ladder 88 to facilitate access to the horizontal growing areas.

Another feature of this invention which is shown in FIGURE 4 is the inclusion of for example, a fan 90 for spreading pollen about upper growing area 14 when plants of this type are disposed therein. Fan 90 can travel back and forth and operates in the heat of day to cooperate with ventilators 92 (later described) during the hottest part of the day. The movement and jerking of beds 20 is also beneficial in the pollination of the blossoms, especially tomatoes.

FIGURE 4 also illustrates another advantageous features of this invention. This feature is the inclusion of a pair of ventilating openings 92 at the upper and lower sides of roof 12. By provision of these ventilators in the roof, the roof itself becomes a convenient natural conduit for the release of excessive heat and humidity in that the warm air rises and then travels along the roof until it escapes through the upper ventilator.

As is apparent from the foregoing description greenhouse 10 is designed to maximize the efficiency of the growing area without sacrifice to the convenience of the workers. For example, since the beds are moved to the workers, walks between pluralities of upper and lower growing areas can be eliminated. The worker can conveniently manipulate the plants in each growing area by simply moving the carriage to the foot of each bed in each growing area. Greenhouse 10 additionally effectively utilizes all other available space for various purposes such as provision of the horizontal growing area for young plants and the utilization of the area beneath the building for further processing. Moreover, every consideration is given to the convenience of the worker by eliminating the need for lifting or carrying heavy baskets or beds.

Greenhouse 10 has a number of other advantages. For example when the curtains 49 are utilized so that the roof is entirely transparent, the worker can have her own shade with her by the positioning of individual curtains since she moves only a few feet a day. The lower growing areas may be used for shade and rest since the plants respond better when not exposed to continuous sun light. The plants may also be rotated for temperature control. Temperature control may also be had from radiant heating in the floor. The east and west walls for the upper growing area may be transparent if desired. It is, however, preferable to have the main lower area opaque to minimize the loss of heat and light from artificial lights 24.

Obviously many modifications and variations of the present invention are possible in light of the above teachings. It is thereby to be understood that within the scope of the appended claims the invention may be practiced otherwise than as specifically described.

I claim:

1. A greenhouse comprising an enclosure having a top wall inclined for being only southernly disposed, at least a portion of said top wall being transparent to permit the rays of the sun to penetrate said enclosure, a first growing area under said transparent portion, first conveyor means in said first growing area, a plurality of inclined beds on said first conveyor means, a second growing area under said first growing area, second conveyor means in said second growing area, a plurality of inclined beds on said second conveyor means, vertical carriage means facing the lower edge of said first and second growing areas and adapted to transverse the length of said greenhouse whereby a user may sit in a substantially vertical position facing said inclined beds, said vertical carriage means including inclined rails supported at their top and bottom, a carriage vertically movable on said rails, and a horizontal work platform disposed adjacent said carriage.

2. A greenhouse as set forth in claim 1 wherein each of said beds is a container having a planar bottom, drain holes in said bottom adjacent one end thereof, and each of said containers being otherwise imperforate along said bottom.

3. A greenhouse as set forth in claim 1 wherein an elevator is provided at each end of said growing area, means interconnecting said elevators whereby the lowering of one elevator causes the other elevator to raise.

4. A greenhouse as set forth in claim 3 including guide means for moving said elevators perpendicular to the inclination of said growing areas, the elevator disposed at the upper ends of said growing areas including bed grasping and releasing means.

5. A greenhouse as set forth in claim 1 wherein secondary horizontal growing areas are arranged in said greenhouse, said carriage being disposed between said secondary growing areas and said inclined growing areas to facilitate the transfer of plants to and from said secondary areas and said inclined areas.

6. A greenhouse as set forth in claim 5 wherein an inclined ladder is disposed near said secondary growing areas, support means supporting the top of said ladder and roller means at the bottom of said ladder supporting said ladder on a horizontal surface.

7. A greenhouse as set forth in claim 5 including conveyorized means for traversing the entire length of said greenhouse and adapted to receive plants thereon.

8. A greenhouse as set forth in claim 5 including a plurality of triangular reservoirs in said enclosure disposed at the lower portion of said second and secondary growing areas.

9. A greenhouse as set forth in claim 1 including pollen distributing means provided adjacent said top wall of said enclosure.

10. A greenhouse as set forth in claim 1 including ventilation means at the lower end of and adjacent to the upper end of said top wall.

11. A greenhouse as set forth in claim 1 including support means under said enclosure, and a work area being under said enclosure.

References Cited

UNITED STATES PATENTS

| | | | |
|---|---|---|---|
| 1,121,722 | 12/1914 | Fessenden | 47—17 |
| 1,718,215 | 6/1929 | Burrage | 47—17 |
| 2,244,677 | 6/1941 | Cornell | 47—17 |
| 2,747,331 | 5/1956 | Steiner | 47—1.2 |
| 2,805,518 | 9/1957 | Stanhope | 47—1.7 |
| 2,917,867 | 12/1959 | Bailey | 47—1.2 |
| 3,254,447 | 6/1966 | Ruthner | 47—1.2 |

FOREIGN PATENTS

| | | |
|---|---|---|
| 1,534,487 | 11/1920 | Great Britain. |
| 51,469 | 9/1932 | Norway. |
| 28,071 | 10/1932 | Netherlands. |

ROBERT E. BAGWILL, Primary Examiner.

U.S. Cl. X.R.

214—89